(No Model.)
F. A. JOHNSON.
REGULATION OF DYNAMO ELECTRIC MACHINERY.
No. 597,419. Patented Jan. 18, 1898.
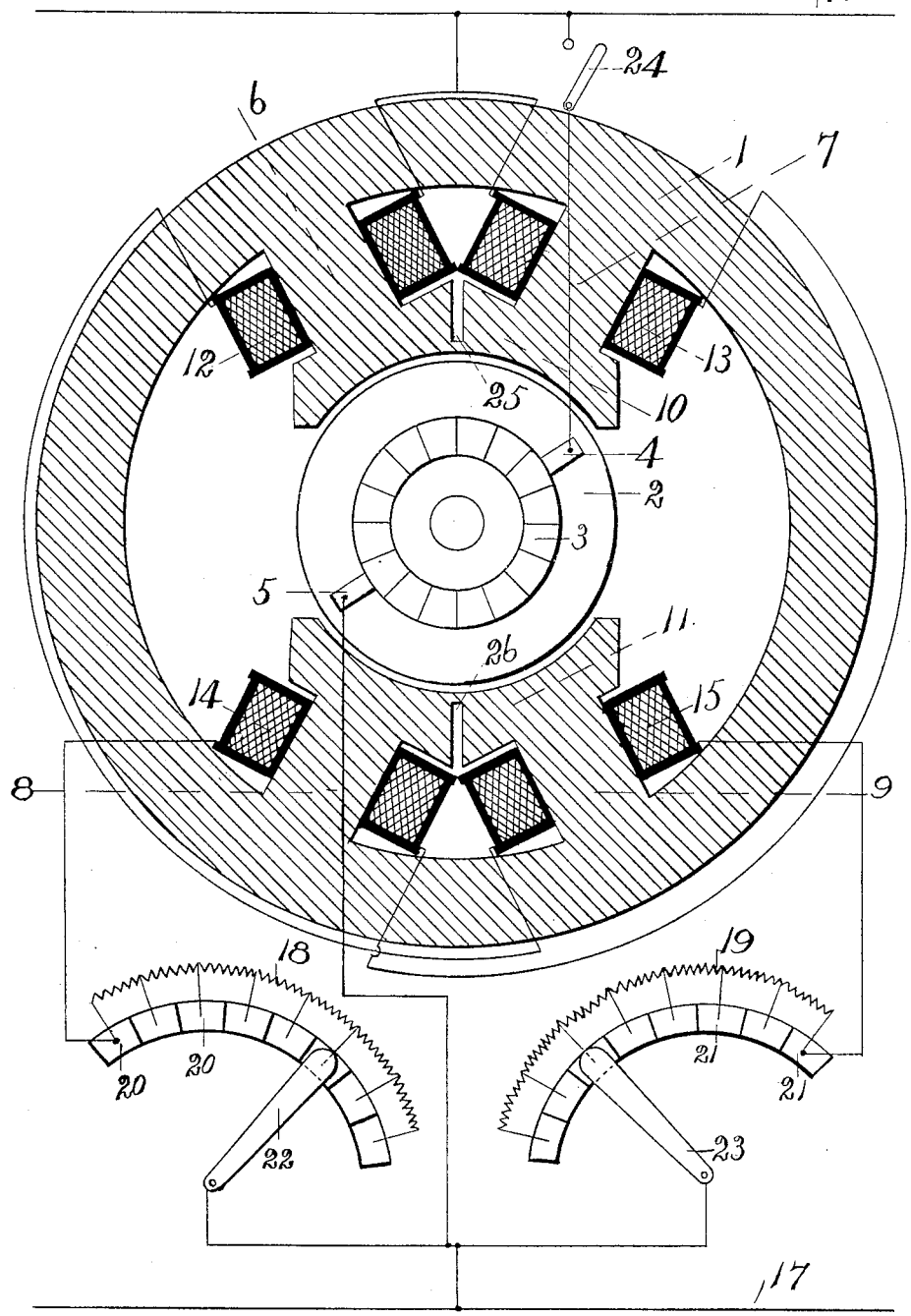
Witnesses
H. W. Thayer
A. E. F. Hausmann.
Inventor
Frederic A. Johnson
by Foster & Freeman
Attorneys

UNITED STATES PATENT OFFICE.

FREDERIC AYRES JOHNSON, OF BINGHAMTON, NEW YORK.

REGULATION OF DYNAMO-ELECTRIC MACHINERY.

SPECIFICATION forming part of Letters Patent No. 597,419, dated January 18, 1898.

Application filed April 24, 1897. Serial No. 633,732. (No model.)

*To all whom it may concern:*

Be it known that I, FREDERIC AYRES JOHNSON, a citizen of the United States, residing at Binghamton, in the county of Broome and State of New York, have invented certain new and useful Improvements in the Regulation of Dynamo-Electric Machinery, of which the following is a specification.

My invention relates to the regulation of dynamo-electric machines, and comprises a new and useful method of and apparatus for effecting such regulation. It is particularly designed for electric motors and will be described with reference thereto; but the same principles are equally applicable to electric generators whose voltage is to be varied within wide limits.

When an electric motor is to be run on a constant-potential circuit, it is well known that efficient speed regulation is exceedingly difficult. In practice it is very common to use two or more small motors instead of one large one and to control them by the series-parallel method. This system gives fairly good results, but greatly increases the first cost and weight of the installation. It is also common to insert variable resistances in series with the armature, but this is obviously an exceedingly-wasteful practice. It has also been proposed to secure the required speed regulation by weakening the field-magnets; but in commercial work this has been found out of the question, except within a narrow range of speed, for the reason that if the field is weakened the neutral line shifts and the motor sparks excessively unless the brushes are also shifted. If this weakening of the field is carried beyond a certain limit, it may happen that there is no point at which the brushes may be set in order that the motor may run without sparking on account of the great distorting effect of the armature reaction upon the comparatively weak field. When the machine is to be used as a generator, producing currents at different voltages, the same difficulties may occur. In order to avoid sparking, it is necessary that at the instant of commutation the short-circuited coil be passing through a field of such strength that when it passes out from under the brush, and is placed in its new relation on the other side of the armature-circuit, it shall be the seat of a current practically equal to the current which it must carry in the new relation. In practice a stiff field is provided and the brushes are so set that commutation takes place on the edge of this field.

In an application for Letters Patent filed April 14, 1897, Serial No. 632,158, I have described a new method of and apparatus for varying the flux through the armature of a direct-current dynamo-electric machine and at the same time maintaining a proper commutating-field under all conditions. The particular method described in that application for producing this result consisted in varying the reluctance of a portion of the magnetic circuit of the machine or in superposing upon the main magneto-motive force in a part of the magnetic circuit only an additional magneto-motive force or counter magneto-motive force. In my present invention, which is subordinate to the broad claims of my said former application, I accomplish the same result by exciting those portions of the magnetic field under which commutation takes place by a magneto-motive force independent of the magneto-motive force which excites the other portions of the field.

The drawing attached to this specification represents, partly in section, a particular embodiment of my invention.

The field-magnet is shown at 1, and 2 is the armature, which may be of any preferred type and is supplied with a commutator 3 and brushes 4 5, connected through a switch 24 across the mains 16 17.

The field structure is shown as consisting of a ring provided with two pole-pieces 10 11, connected with the ring by necks 6 7 8 9, on which are wound the exciting-coils 12 13 14 15. The coils 12 15 are connected across the mains in series with the adjustable resistance 19, while the coils 13 14 are connected across the mains in series with the adjustable resistance 18.

It will be seen that the flux through the coils under commutation is furnished by the coils 13 14 and can be maintained at such a value that the machine will run sparklessly, without reference to the excitation of the necks 6 7.

In the condition of slowest speed, if the machine is running as a motor both resistances 18 19 are cut out entirely—that is to say, the arms 22 and 23 are pushed to the extreme left and to the extreme right, respectively. The field strength is then a maximum. If now the arm 23 be pushed to the left, the current in the exciting-coils 12 15 will be weakened and the flux through the necks 6 7 will be decreased, which will increase the speed of the motor. This may be carried so far as to allow the lines of force from 7 to return through the neck 6 and the lines of force from 8 to return through 9, which will cause the electromotive forces induced in certain portions of the armature to be opposite in direction to those in other portions and still further decrease the counter electromotive force of the armature and increase the speed. In this case, however, and in any case in which the magneto-motive forces of the two necks of either pole-piece are unequal there will be a certain tendency for a portion of the flux to return through the pole-pieces 10 and 11 without cutting the armature—that is to say, 6 and 9 will form magnetic shunts for the magneto-motive forces of 7 and 8. To avoid this, I prefer to cut slots 25 26 in the pole-pieces, as shown, of sufficient width and sufficient depth to prevent this effect from becoming unduly large.

If in any of the conditions above supposed the machine is running in such a direction that the brushes are set under the necks 6 and 9, it is obvious that the manipulations would be opposite. The machine is thus adapted to act both as a generator and as a motor and to run in either direction, with a wide range of voltages and speeds.

The variable resistances 18 19 may be of any preferred type, but are shown as continuous coils connected at intervals to the segments 20 21, over which sweep the arms 22 23. It is preferable to make these arms of such width that the circuit is not opened in passing from one plate to the other.

It will be obvious that my invention is not limited to shunt-wound machines nor to any particular type or structure and that various changes may be made without departing from the spirit of my invention.

I therefore claim as my invention and desire to secure by Letters Patent—

1. The method of varying the speed of an electric motor, which consists in generating a flux passing through the coils under commutation by a practically constant magneto-motive force, and generating a second flux passing through other coils of the armature, by an independent magneto-motive force, and varying said second flux at will, independent of the conditions of the main circuit.

2. The method of avoiding sparking in a dynamo-electric machine, which consists in exciting those portions of the field-magnets under which commutation takes place with a magnetism independent of the magnetism exciting the remaining portions of the field-magnets, and varying the said independent magnetism at will, independent of the conditions of the circuit, to vary the total flux of the armature.

3. In an electric motor, the combination of two sources of magneto-motive force, acting upon separate magnetic circuits terminating in a common pole-piece, and means for varying at will within wide limits that one of the two sources of magneto-motive force which does not furnish the flux for the coils under commutation, without materially decreasing the flux through the coils under commutation, to vary the speed of the motor, substantially as described.

4. In a dynamo-electric machine, a polar face excited from two separate necks, coils on said necks for furnishing said excitation, and switches for separately varying the currents in said coils, substantially as described.

5. In a dynamo-electric machine, a plurality of polar faces, necks joining said faces with the frame of the machine, exciting-coils on said necks, and a hand-operated switch for varying the current in one of said coils, substantially as described.

6. A field-magnet for a dynamo-electric machine, comprising a ring, a plurality of polar faces connected to said ring by a plurality of necks, coils on said necks, and a switch for varying the current in one of said coils, substantially as described.

7. In a dynamo-electric machine, a slit pole-piece joined to the frame of the machine by two necks, in combination with exciting-coils wound on said necks, and a switch for varying at will the current in one of said coils, substantially as described.

In testimony whereof I have signed my name to this specification in the presence of two subscribing witnesses.

FREDERIC AYRES JOHNSON.

Witnesses:
L. SEYMOUR,
F. H. BERGHERFER.